Aug. 11, 1959     J. A. KITCHEN ET AL     2,898,978
GASEOUS FUEL COMBUSTION APPARATUS
Filed Feb. 19, 1957
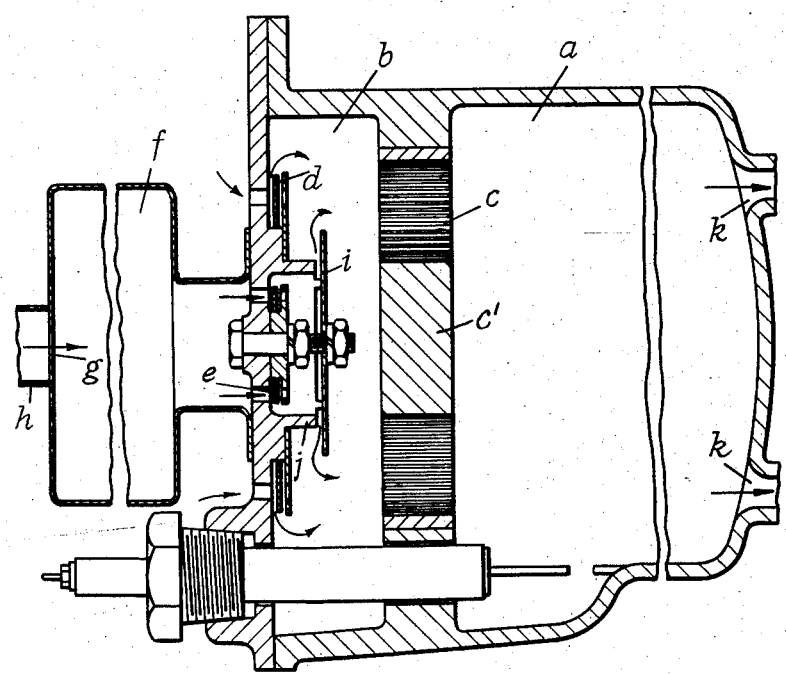
Inventors
J. A. Kitchen
F. R. Denham
By Glennal Downing Siebold
Attys.

2,898,978
GASEOUS FUEL COMBUSTION APPARATUS

John Alfred Kitchen, Markham, Ontario, and Frederick Ronald Denham, Welland, Ontario, Canada, assignors, by mesne assignments, to Lucas-Rotax Limited, Ontario, Canada Application February 19, 1957, Serial No. 641,166

Claims priority, application Great Britain February 20, 1956

3 Claims. (Cl. 158—7)

This invention relates to a gaseous fuel combustion apparatus of so-called pulsating type wherein the inflow of fuel and air is controlled by valves responsive to intermittent pressure pulses in the combustion chamber.

The object of the invention is to provide an apparatus of the kind aforesaid wherein the fuel-air mixture is prepared before admission to the combustion chamber.

An apparatus in accordance with the invention comprises the combination of a combustion chamber, a mixing chamber provided with fuel gas and combustion air inflow control valves, and a flame trap separating the two chambers.

In one example as illustrated by the accompanying drawing there is provided a combustion chamber $a$ of cylindrical form. At one end this chamber is extended or has secured to it an extension, which forms a mixing chamber $b$, the two chambers being separated by a partition adapted to form a flame trap $c$, the latter being constructed from a metal strip which is spirally coiled around an imperforate central portion $c^1$, and the convolutions of which are separated by corrugations in the strip.

On an end wall of the mixing chamber are mounted an annular air valve $d$ for controlling the inflow of combustion air from the outer atmosphere, and a fuel gas valve $e$ surrounded by the annular air valve, these valves being of any convenient construction.

Also on the end wall of the mixing chamber carrying the valves, is secured a fuel gas cushioning chamber $f$. Gas is admitted to the chamber through a restricted orifice $g$ from a supply pipe $h$. Further there is preferably provided in the mixing chamber at the delivery side of the gas valve $e$ a plate $i$ which together with an annular part $j$ in the said chamber forms an annular orifice for deflecting the gas into the incoming air.

When the apparatus is in action the air entering the mixing chamber in a direction parallel with the axis of the chamber meets the radially flowing stream of fuel gas and forms therewith a combustible mixture.

From the mixing chamber the mixture passes through the flame trap to the combustion chamber where it is ignited by an electric sparking plug, spreading of the resultant flame to the mixing chamber being prevented by the trap.

In other respects the mode of action is essentially similar to other forms of apparatus of the pulsating kind, the valves being intermittently closed by the pressure pulses generated in the combustion chamber, and the combustion products being discharged through one or more outlets as $k$ to apparatus to be heated by the said products.

Having thus described our invention what we claim as new and desire to secure by Letters Patent is:

1. A gaseous fuel combustion apparatus comprising in combination a combustion chamber having an entrance end and at least one outlet, a mixing chamber situated at the entrance end of said combustion chamber and provided with a fuel gas inlet valve means and with a combustion air inlet valve means of annular form surrounding said fuel gas inlet valve means, which valve means are intermittently closable by pressure pulses generated in said combustion chamber, means provided in said mixing chamber to direct fuel gas, admitted to said mixing chamber through said fuel gas inlet valve means, into combustion air entering said mixing chamber through said combustion air inlet valve means, and partition means situated between said combustion chamber and mixing chamber and formed by a metal strip spirally coiled around an imperforate central portion to provide a flame trap which permits fuel gas mixed with combustion air to flow therethrough from said mixing chamber to said combustion chamber.

2. A gaseous fuel combustion apparatus according to claim 1, and having on the outer side of the end of the mixing chamber remote from the combustion chamber, a fuel gas cushioning chamber which leads to the fuel gas inlet valve means, and is provided with an inlet orifice for fuel gas.

3. A gaseous fuel combustion apparatus according to claim 1, in which the means provided in the mixing chamber to direct the fuel gas comprises a fuel gas-reception compartment situated in said mixing chamber at the delivery side of the fuel gas inlet valve means, and having an annular discharge orifice for directing fuel gas from said compartment into combustion air entering said mixing chamber through the combustion air inlet valve means.

References Cited in the file of this patent

UNITED STATES PATENTS

| | | |
|---|---|---|
| 2,001,739 | MacGregor | May 21, 1935 |
| 2,523,308 | Kemmer | Sept. 26, 1950 |
| 2,525,782 | Dunbar | Oct. 17, 1950 |
| 2,552,845 | Crosby | May 15, 1951 |
| 2,561,194 | Furczyk | July 17, 1951 |
| 2,632,294 | Wall | Mar. 24, 1953 |
| 2,653,654 | Kamm | Sept. 29, 1953 |
| 2,657,708 | Kamm | Nov. 3, 1953 |
| 2,717,637 | Huber | Sept. 13, 1955 |
| 2,719,580 | Haag | Oct. 4, 1955 |
| 2,763,983 | Kafka | Sept. 25, 1956 |

FOREIGN PATENTS

| | | |
|---|---|---|
| 386,908 | Great Britain | Jan. 26, 1933 |